United States Patent
Zong et al.

(10) Patent No.: US 10,007,022 B2
(45) Date of Patent: Jun. 26, 2018

(54) RAY INSPECTION SYSTEM AND RAY INSPECTION METHOD FOR A CONTAINER

(71) Applicant: NUCTECH COMPANY LIMITED, Beijing (CN)

(72) Inventors: Chunguang Zong, Beijing (CN); Ying Li, Beijing (CN); Hejun Zhou, Beijing (CN); Jianmin Li, Beijing (CN); Yuanjing Li, Beijing (CN); Yulan Li, Beijing (CN); Li Zhang, Beijing (CN); Zhiqiang Chen, Beijing (CN)

(73) Assignee: NUCTECH COMPANY LIMITED, Beijing (CN)

(*) Notice: Subject to any disclaimer, the term of this patent is extended or adjusted under 35 U.S.C. 154(b) by 0 days. days.

(21) Appl. No.: 15/709,350

(22) Filed: Sep. 19, 2017

(65) Prior Publication Data

US 2018/0081078 A1    Mar. 22, 2018

(30) Foreign Application Priority Data

Sep. 20, 2016  (CN) .......................... 2016 1 0835957

(51) Int. Cl.
*G01F 23/00*    (2006.01)
*G01V 5/00*     (2006.01)

(52) U.S. Cl.
CPC .................. *G01V 5/0066* (2013.01)

(58) Field of Classification Search
CPC .......... G01F 1/00; G01N 23/08; G01N 23/02; G01N 2223/639; G01N 23/04; G01V 5/00; G01V 5/0025; G01V 5/0091; G01V 5/008; G01T 3/06
See application file for complete search history.

(56) References Cited

U.S. PATENT DOCUMENTS

| | | | | | |
|---|---|---|---|---|---|
| 3,832,545 | A * | 8/1974 | Bartko | ................. | G01V 5/0008 250/359.1 |
| 5,838,759 | A * | 11/1998 | Armistead | ............ | B66C 19/007 378/57 |
| 6,542,580 | B1 * | 4/2003 | Carver | ................... | G01N 23/04 378/57 |
| 7,166,844 | B1 * | 1/2007 | Gormley | .............. | G01V 5/0016 250/358.1 |
| 8,541,756 | B1 * | 9/2013 | Treas | ..................... | G01N 23/09 250/390.01 |
| 2004/0017887 | A1 * | 1/2004 | Le | .......................... | G01N 23/04 378/57 |
| 2005/0157842 | A1 * | 7/2005 | Agrawal | ................ | G01N 23/04 378/27 |
| 2006/0056584 | A1 * | 3/2006 | Allman | ................ | G01V 5/0008 378/57 |

(Continued)

*Primary Examiner* — Kiho Kim
(74) *Attorney, Agent, or Firm* — Baker & Hostetler LLP

(57) ABSTRACT

A ray inspection system used to be mounted in a container yard to inspect an object within a container is provided. The ray inspection system includes: a ray generator device configured to emit a ray, a ray receiving device configured to receive the ray, and at least one chamber for receiving the ray generator device and the ray receiving device therein. Each of the at least one chamber is configured to be a standard container or a chamber which has a same shape, a same size and a same structure as a standard container such that the ray inspection system is adapted to be stacked in the container yard.

18 Claims, 6 Drawing Sheets

(56) References Cited

U.S. PATENT DOCUMENTS

| | | | |
|---|---|---|---|
| 2007/0080297 A1* | 4/2007 | Clarke | G01T 1/167 |
| | | | 250/366 |
| 2009/0010387 A1* | 1/2009 | Kang | G01N 23/04 |
| | | | 378/57 |
| 2010/0189226 A1* | 7/2010 | Kotowski | G01N 23/04 |
| | | | 378/198 |
| 2012/0093289 A1* | 4/2012 | Arodzero | G01V 5/0041 |
| | | | 378/57 |
| 2014/0044233 A1* | 2/2014 | Morton | G01V 5/0008 |
| | | | 378/62 |
| 2014/0211916 A1* | 7/2014 | Morton | G01V 5/0016 |
| | | | 378/57 |
| 2015/0204999 A1* | 7/2015 | Sun | G01V 5/0016 |
| | | | 378/57 |
| 2015/0219786 A1* | 8/2015 | Wieschemann | G01V 5/0008 |
| | | | 378/57 |
| 2015/0325401 A1* | 11/2015 | Langeveld | H01J 37/1472 |
| | | | 378/57 |
| 2015/0369955 A1* | 12/2015 | Al-Hoshani | G01V 5/0016 |
| | | | 378/57 |
| 2016/0259067 A1* | 9/2016 | Morton | G01T 1/2018 |
| 2017/0059739 A1* | 3/2017 | Mastronardi | G01V 5/0008 |
| 2017/0249530 A1* | 8/2017 | Fer | G06K 9/4604 |

* cited by examiner

RAY INSPECTION SYSTEM AND RAY INSPECTION METHOD FOR A CONTAINER

CROSS-REFERENCE TO RELATED APPLICATION

The present application claims priority to Chinese Patent Application No. 201610835957.7, filed on Sep. 20, 2016, entitled "RAY INSPECTION SYSTEM AND RAY INSPECTION METHOD FOR A CONTAINER", which is incorporated herein by reference in its entirety.

BACKGROUND

Technical Field

The present disclosure relates to technical field of container inspection, and particularly to a ray inspection system and a ray inspection method for a container mounted in a container yard.

Description of the Related Art

Currently, many places where containers are stacked, such as a cargo terminal, a wharf, or a port, encounter land shortage. Meanwhile, a conventional container inspection system is relatively large and commonly needs a separated field or place for mounting. However, such a container inspection system not only occupies much valuable space of a port but also causes problems such as long construction period, high cost.

Further, a conventional container inspection system commonly operates as following: containers are unloaded to a port and transported to a container yard, then, a container to be inspected is transported from the container yard by a vehicle to a field where the inspection system is located and then the container is scanned and inspected; after inspection, the container is transported back to the container yard by the vehicle. Such an inspection process spends time and needs great effort, which reduces efficiency of operation in the container yard. In addition, the conventional container inspection system further needs construction and is hard to assemble and disassemble, and even is non-transferred.

SUMMARY

The present disclosure provides a ray inspection system, which can be mounted in a container yard to inspect an object in a container, and a ray inspection method.

According to an aspect of the present disclosure, there is provided a ray inspection system used to be mounted in a container yard to inspect an article within a container, the ray inspection system including:

a ray generator device configured to emit a ray, a ray receiving device configured to receive the ray, and at least one chamber for receiving the ray generator device and the ray receiving device therein, the ray inspection system being configured to define a scanning passage, wherein:

each of the at least one chamber is configured to be a standard container or a chamber which has a same shape, a same size and a same structure as a standard container, such that the ray inspection system is adapted to be stacked in the container yard.

In an embodiment, each of the at least one chamber is provided with a hoisting coupling that is the same as that of the standard container so as to be hoisted by a container transfer apparatus.

In an embodiment, the ray inspection system includes a first chamber, a second chamber and a third chamber, the first chamber is arranged at a side of the scanning passage in the container yard, and the second chamber and the third chamber, stacked up-down with each other, are arranged at the other side of the scanning passage, and wherein, the first chamber is provided with the ray generator device therein and each of the second chamber and the third chamber is provided with the ray receiving device therein, and the ray generator device and the ray receiving devices are substantially aligned with one another in a second direction perpendicular to a first direction along which the scanning passage extends.

In an embodiment, the at least one chamber comprises a first chamber, a second chamber, a third chamber and a fourth chamber, the second chamber and the first chamber, stacked up-down with each other, are arranged at a side of the scanning passage in the container yard, and the third chamber and the fourth chamber, stacked up-down with each other, are arranged at the other side of the scanning passage, and wherein, each of the first chamber located downside and the fourth chamber located downside is provided with the ray generator device and the ray receiving device therein, and each of the second chamber located upside and the third chamber located upside is provided with the ray receiving device, wherein the ray generator device and the ray receiving device provided in each of the first chamber and the fourth chamber are arranged to space away from each other in the first direction along which the scanning passage extends, and the ray generator device in the first chamber is substantially aligned with the ray receiving devices in the third chamber and the fourth chamber in the second direction perpendicular to the first direction, and the ray receiving devices in the first chamber and the second chambers are substantially aligned with the ray generator device in the fourth chamber in the second direction perpendicular to the first direction.

In an embodiment, the at least one chamber comprises one chamber, which is arranged at a side of the scanning passage in the container yard, and in which the ray generator device and the ray receiving device are provided.

In an embodiment, the ray inspection system further includes bases that respectively correspond to the chambers at either side of the scanning passage, the bases being provided with fixing pins and/or fixing holes and each of the chambers is provided with corresponding fixing holes and/or fixing pins such that, when the chambers are positioned and mounted on corresponding bases respectively by engagements between the fixing pins and the fixing holes, the ray generator device and the ray receiving devices that are located at either side of the scanning passage are substantially aligned to one another in the second direction.

In an embodiment, a height of the bases is equal to a difference between a height of a high container and a height of a standard container.

In an embodiment, the ray inspection system further includes a control device that is in communication with a control system in the container yard and/or a database in the container yard.

In an embodiment, the ray inspection system further includes a photoelectric conversion device configured to convert the ray received by the ray receiving device to a digital signal, the photoelectric conversion device being in communication with the control device so as to transmit image information as the digital signal to the control device.

In an embodiment, the ray inspection system further includes a container symbol identification device configured to identify contain symbol and being in communication with the control device so as to transmit the identified container symbol information to the control device, the control device being configured to read corresponding container information from the control system of the container yard and/or a database of the container yard according to the identified container symbol and to bond the container information to the image information.

In an embodiment, the ray inspection system further includes a ray protective device arranged in each of the at least one chamber and configured to shield the ray at a preset location or to shield the ray at preset time.

According to another aspect of the present disclosure, there is provided a ray inspection method for inspecting a container in a container yard using the above ray inspection system, the method including:

stacking the ray inspection system in the container yard by using a container transfer apparatus in the container yard, such that the ray inspection system defines a scanning passage; and when the container transfer apparatus performs stacking operation to the container in the container yard, turning on the ray generator device of the ray inspection system and controlling the container transfer apparatus to move the container at a preset velocity along the scanning passage through the ray inspection system, so as to scan the container by the ray inspection system.

In an embodiment, the ray inspection method further includes:

when the container transfer apparatus is in an idle state where no stacking operation is performed, turning on the ray generator device of the ray inspection system and controlling the container transfer apparatus to transfer the container and then to move the container at a preset velocity along the scanning passage through the ray inspection system, so as to scan the container by the ray inspection system.

In an embodiment, the ray inspection system further comprises bases that respectively correspond to the chambers at either side of the scanning passage, the bases being provided with fixing pins and/or fixing holes and each of the chambers is provided with corresponding fixing holes and/or fixing pin such that, when the chambers are positioned and mounted on corresponding bases respectively by engagements between the fixing pins and the fixing holes, the ray generator device and the ray receiving device that are located at either side of the scanning passage are substantially aligned to one another in the second direction;

wherein the stacking the ray inspection system in the container yard by using the container transfer apparatus in the container yard comprises:

mounting the bases at preset positions in the container yard; and locating the ray inspection system on the bases by using the container transfer apparatus in the container yard.

In an embodiment, the ray inspection system further comprises a container symbol identification device configured to identify contain symbol and being in communication with a control device so as to transmit the identified container symbol information to the control device, the control device being configured to read corresponding container information from a control system of the container yard and/or a database of the container yard according to the identified container symbol and to bond the container information to the image information;

the method further comprises:

identifying the container symbol on the container that is being scanned;

reading the corresponding container information from the control system of the container yard and/or the database of the container yard according to the container symbol; and bonding the container information to image information obtained by scanning of the ray inspection system.

In an embodiment, the method further includes:

after completing the scanning to a first stack of containers in the container yard, transferring the ray inspection system to a second stack of containers which are located at different position from the first stack of containers in the container yard by using the container transfer apparatus in the container yard, so as to scan the second stack of containers.

BRIEF DESCRIPTION OF THE DRAWINGS

In order to make the object, technical scheme and advantages of the present disclosure more definitely, the present disclosure is further described in detail in conjunction with the embodiments with reference to the drawings. In the drawings.

DETAILED DESCRIPTION OF THE EMBODIMENTS

Figure 1:
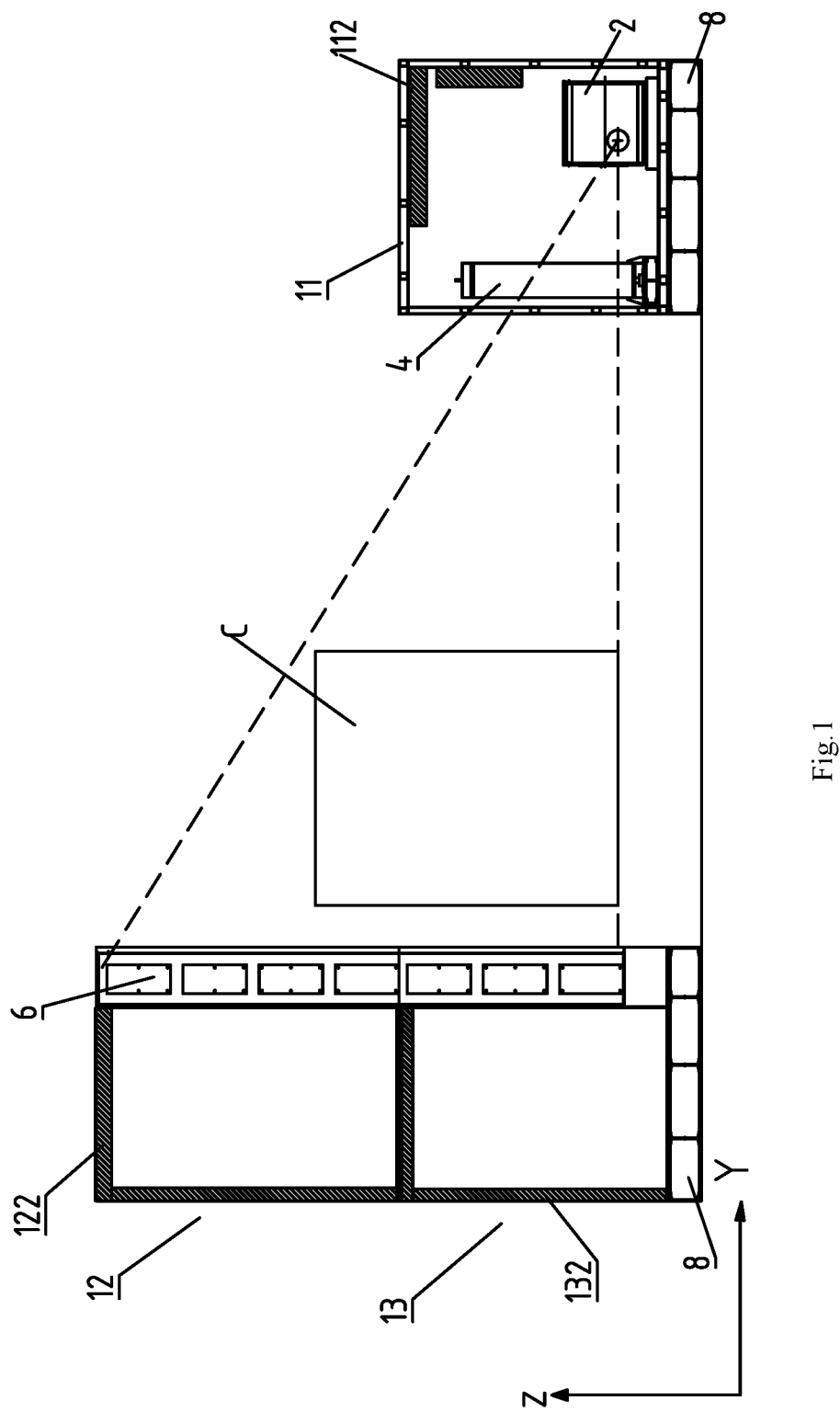
FIG. 1 is a schematic view of a ray inspection system according to an embodiment of the present disclosure, in which the ray inspection system includes three chambers, and the ray generator device and the ray receiving device are respectively arranged at either side of a scanning passage.

Embodiments of the present disclosure will be described in detail hereinafter. It is noted that the embodiments described herein are intended to for exemplar illustration, instead of limitation on the present disclosure. In the following description, an amount of special details are described in order to provide a complete understanding on the present disclosure. However, it is obvious for those skilled in the art that the present invention is not necessary to be implemented with the details herein. In other embodiments of the present disclosure, known structures, circuits, materials or processes are not described for avoiding confusing the present disclosure.

In this description, "an embodiment", "embodiments", "an example" or "examples" are used to represent features, structures or characteristics described in conjunction with the embodiment or example are included in at least one embodiment of the present disclosure. Thus, the wordings of "in an embodiment", "in the embodiment", "in an example" or "as an example" used in the whole description are not necessary to indicate the same embodiment or example. In addition, the special features, structures or characteristics may be combined in a suitable combination and/or sub-combination in one or more embodiment or example. In addition, it is understood by those skilled in the art that the term of "and/or" used herein includes any of one or more item listed herein that are associated with one another, or combination thereof In the drawings, for easy of description, an XYZ coordinate system is provided, in which X axis represents a direction of a scanning passage in a container yard, i.e., a length direction of a container, Y axis represents a width direction of the container and Z axis represents a height direction of the container.

FIG. 1 illustrates a schematic view of a ray inspection system according to an embodiment of the present disclosure. The ray inspection system is configured to be arranged in a container yard to inspect object(s) in a container. It is noted that, in FIG. 1, in order to clearly illustrate the ray inspection system according to the present disclosure, other containers and a lifting mechanical device, etc. in the container yard are omitted.

The ray inspection system mainly includes: a ray generator device configured to emit a ray, a ray receiving device configured to receive the ray, and at least one chamber for receiving the ray generator device and the ray receiving device therein. The ray inspection system is configured to define a scanning passage. Each of the at least one chamber is configured to be a standard container or a chamber which has a same shape, a same size and a same structure as a standard container such that the ray inspection system is adapted to be stacked in the container yard. Herein, "each of the at least one chamber is configured to be a standard container or a chamber which has a same shape, a same size and a same structure as a standard container" means: each chamber has a shape of cuboid like a standard container and size of each chamber (including length, width and height, etc.) are respectively equal to those of the standard container; and, each chamber has the same structure as a standard container, and particularly has an outside coupling structure, for example, each chamber has the same hoisting coupling as a standard container such that each chamber is adapted to be hoisted by an existing lifting mechanism in the container yard. It can be seen that the ray inspection system according to embodiments of the present disclosure may be seamlessly mounted with a standard container in the container yard by using an existing lifting mechanism without providing a dedicated space and a special mounting apparatus, and thus the space may be saved and mounting and transfer operations may be simplified.

Figure 6:
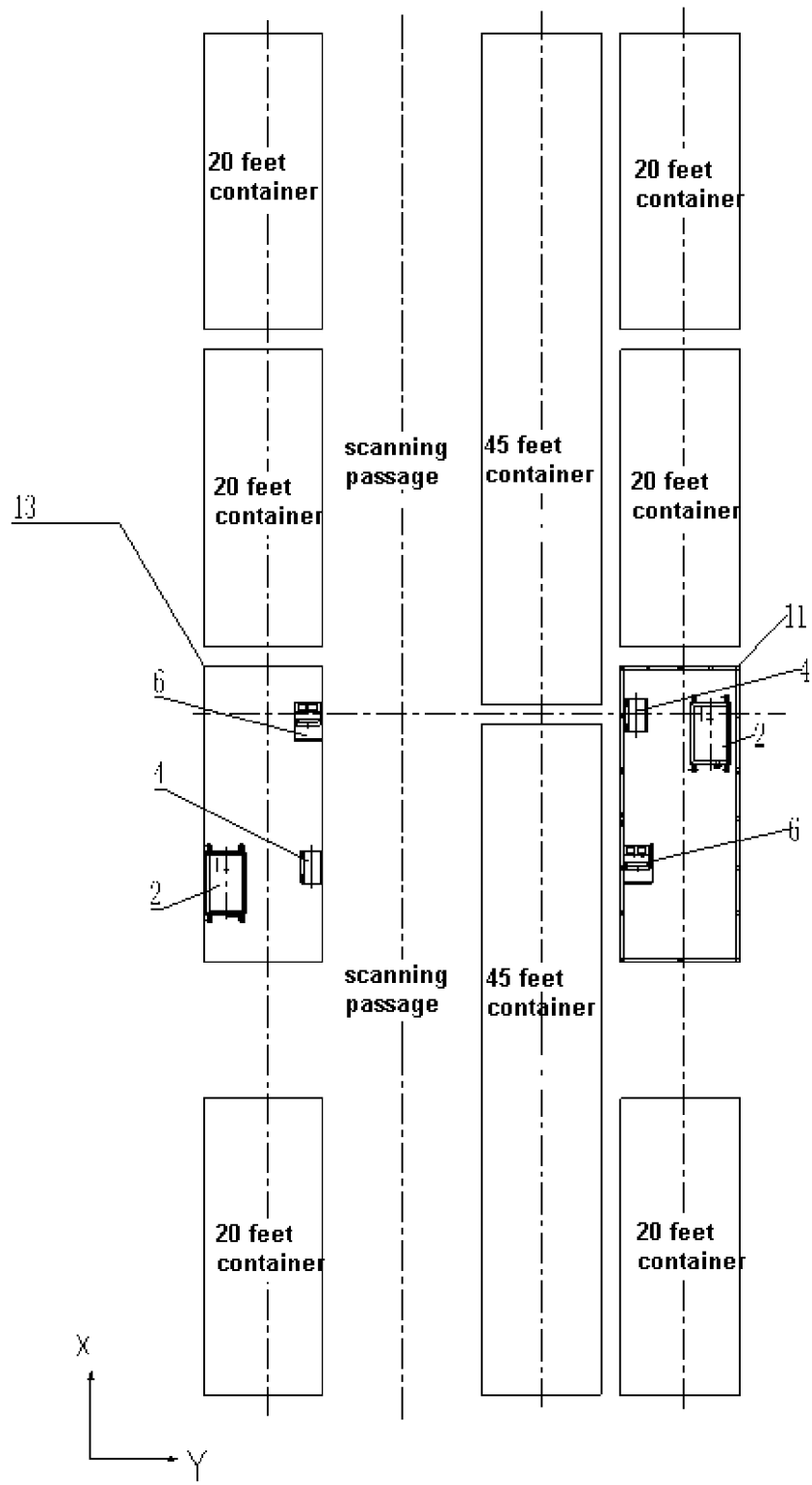
FIG. 6 schematically illustrates an arrangement of a ray inspection system according to an embodiment of the present disclosure when scanning a container in 45 feet length.
Figure 7:
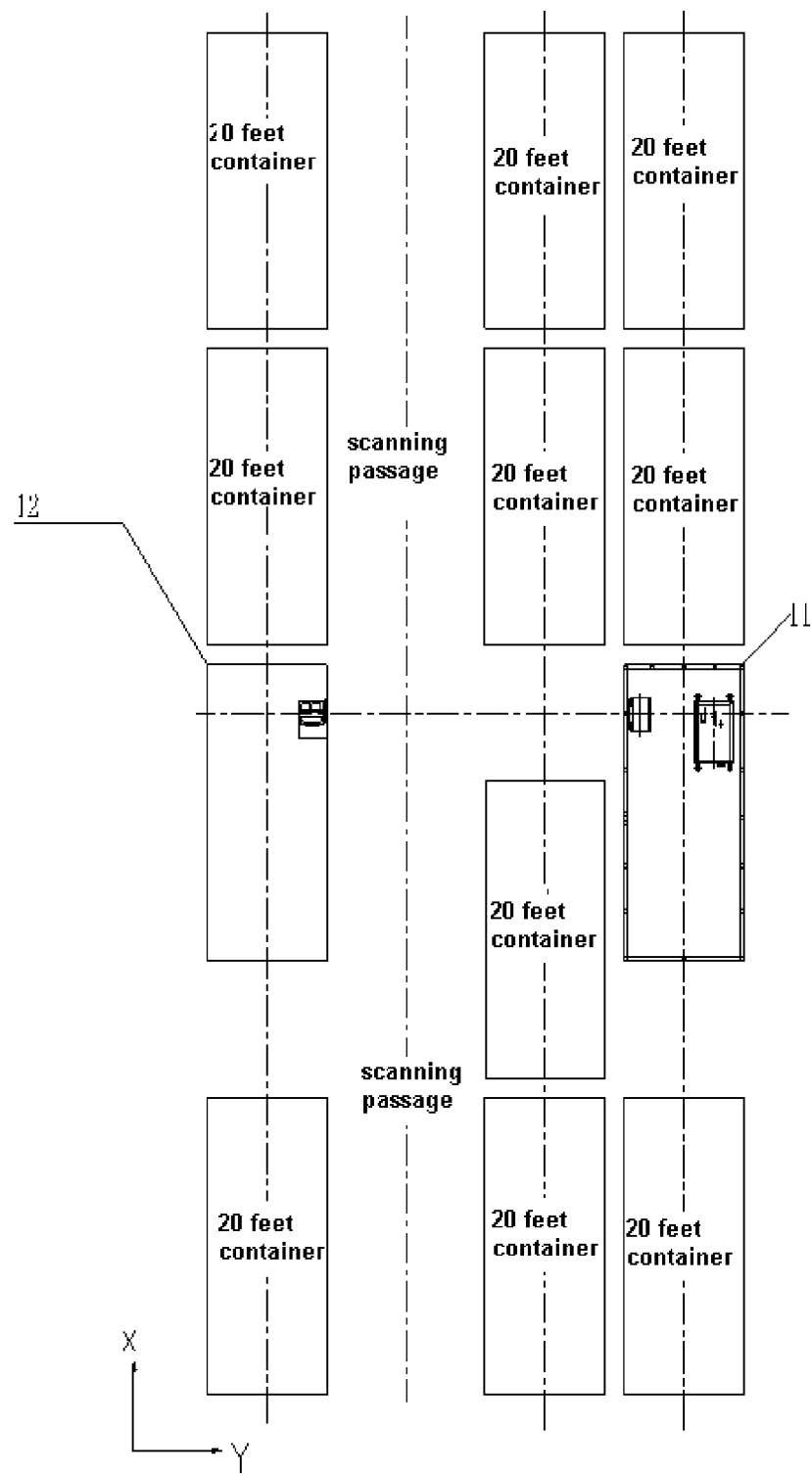
FIG. 7 schematically illustrates an arrangement of a ray inspection system according to an embodiment of the present disclosure when scanning a container in 20 feet length.

In the embodiment as shown in FIG. 1, the ray inspection system includes three chambers, i.e., a first chamber 11, a second chamber 12 and a third chamber 13. The first chamber 11 is arranged at a side (right side in FIG. 1) of the scanning passage P (as shown in FIGS. 6 and 7) in the container yard, the second chamber 12 and the third chamber 13 are arranged in up-down manner at the other side (left side in FIG. 1) of the scanning passage P in the container yard. A ray generator device 2 is disposed in the first chamber 11. The ray generator device 2 may be a radiation element such as cobalt-60, or may be an X-ray generator, or may be an X-ray machine, or also may be a neutron generator. The second chamber 12 and the third chamber 13 each may be provided with a ray receiving device 6 therein, and the ray receiving device 6 may include a plurality of detectors, detector array, etc..

As shown in FIG. 1, the first chamber 11 may be further provided with a collimator 4 therein, and the ray generator device 2, the collimator 4 and the ray receiving device 6 are substantially aligned with one another in a second direction (Y axis direction) perpendicular to the first direction (X axis direction as shown in FIG. 6) of the scanning passage P, such that ray emitted by the ray generator device 2 may be received by the ray receiving device 6. In other words, the ray generator device 2, the collimator 4 and the ray receiving device 6 are substantially located in a same plane perpendicular to the first direction of the scanning passage P. Furthermore, the ray generator device 2 is configured such that the ray emitted by the ray generator device 2 can scan the entire container C along the height direction (Z axis direction as shown in FIG. 1) of the container. Although not shown in Figure, it is understood for those skilled in the art that the container C is hanged by a lifting mechanism in the container yard. In an embodiment, the lifting mechanism moves at a preset velocity, such that the container C moves along the scanning passage so as to be scanned and inspected entirely.

Further, ray inspection system may further include bases 8 configured to respectively correspond to the chambers at either side of the scanning passage P. The bases 8 are provided with fixing pins while the corresponding chambers 11, 13 are provided with corresponding fixing holes. When the chambers 11, 13 are respectively positioned on and mounted to the corresponding bases 8 through engagements between the fixing pins and the fixing holes, the ray generator device 2 and the ray receiving device 6 that are respectively located at either side of the scanning passage P and correspond to each other are aligned to each other in the Y axis direction. That is, the ray generator device 2 and the ray receiving device 6 that are respectively located at either side of the scanning passage P and correspond to each other are substantially located in a same plane perpendicular to the X axis direction. With this configuration, it ensures the ray generator device and the ray receiving device are aligned to each other in the first direction of the scanning passage. As such, when mounting the ray inspection system or transferring the ray inspection system to another location, after mounting the bases, the ray generator device and the ray receiving device may be achieved alignment to each other in the transverse direction perpendicular to the first direction of the scanning passage by directly positioning and mounting the chambers of the ray inspection system onto the bases, thereby facilitating assembly and location transferring of the ray inspection system.

Alternatively, the based 8 may be provided with fixing holes while the corresponding chambers 11, 13 are provided with fixing pins; or, the bases 8 and chambers 11, 13 are respectively provided with other type structure for positioning and fitting.

In an embodiment of the present disclosure, a height of a base 8 is equal to a height difference between a height of a high container and a height of a standard container. As a height of a chamber of the ray inspection system is normally equal to that of a standard container, after the chamber of the ray inspection system is mounted to the base 8, a total height of a chamber, which has been mounted to a base, and the base is just equal to the height of the high container and thus still meets requirement in terms of size in the container yard and will not interrupt stacking of other containers in the container yard.

As shown in FIG. 1, the chambers 11, 12, 13 may be provided respectively with ray protective devices 112, 122, 132 to prevent radiation from leaking to ambience or eliminate amount of radiation that leaks to ambience. The ray protective devices 112, 122, 132 may be arranged on a top inner wall, a side inner wall or a bottom inner wall of respective chamber according to requirement of radiation protection. The ray protective device may be configured to shield ray at preset location or to shield the ray at preset time.

It is noted that, as the ray inspection system according to the present disclosure may be mounted in a container yard by a lifting mechanism in the container yard and a current normal container yard has substantially been achieved fully mechanical, automatic operation, i.e., no special operator is needed here, compared to the container inspection system in prior art which is needed to be transferred to a dedicated container inspection system by a dedicated person-driven vehicle, the container inspection system according to the disclosure reduces requirement of radiation protection, and thus may have a simplified structure and reduced product cost.

Figure 2:
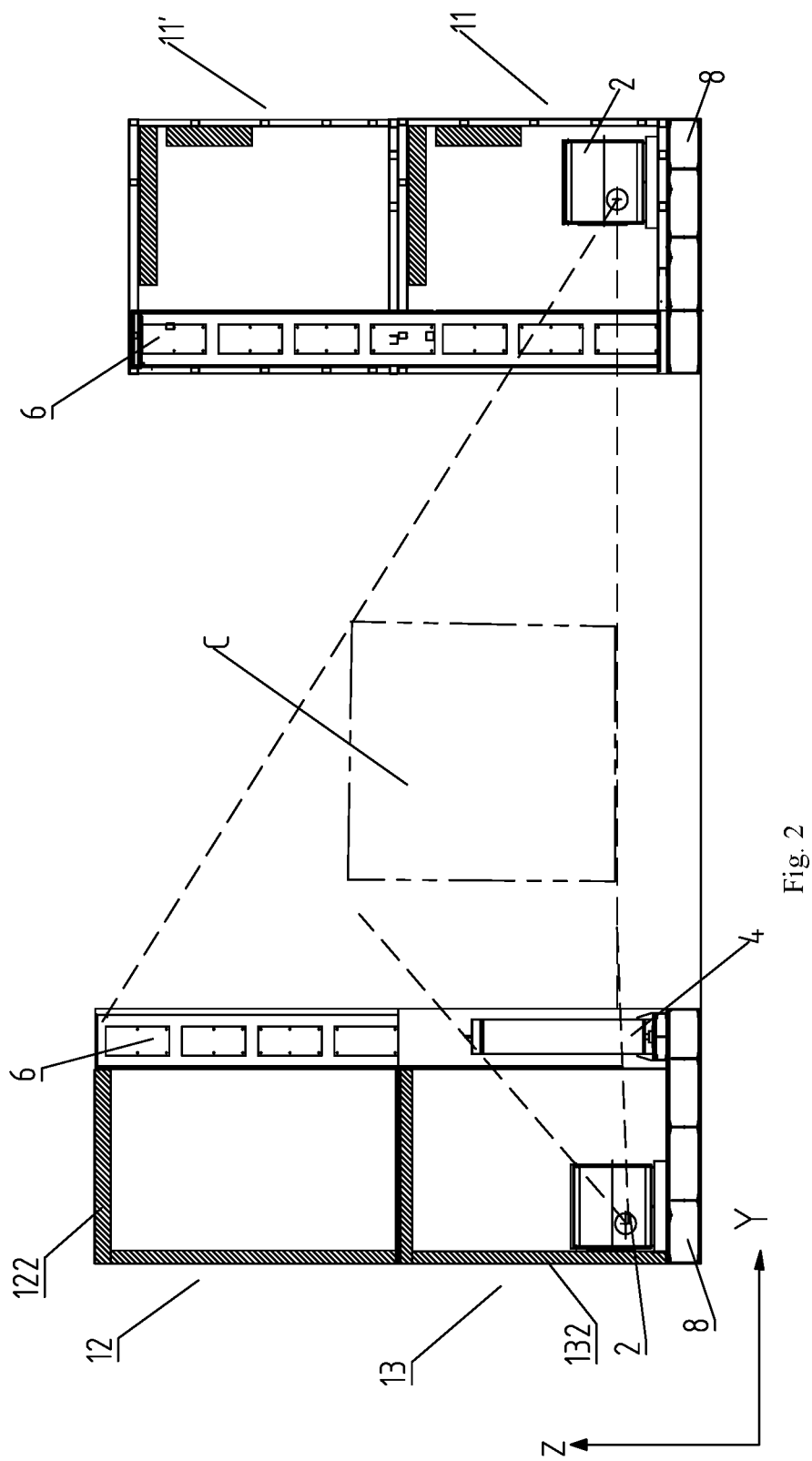
FIG. 2 is a schematic view of a ray inspection system according to an embodiment of the present disclosure, in which the ray inspection system includes four chambers, and the ray generator device and the ray receiving device are respectively arranged at either side of a scanning passage.

FIG. 2 illustrates a schematic view of a ray inspection system according to another embodiment of the present disclosure. For avoiding repeatedly description, the following description is mainly related to differences of this embodiment from the embodiment as shown in FIG. 1.

As shown in FIG. 2, the ray inspection system includes four chambers, i.e., a first chamber 11, a second chamber 11', a third chamber 12 and a fourth chamber 13, the second chamber 11' and the first chamber 11 are arranged in an up-down stack manner at a side of a scanning passage P in the container yard, and the third chamber 12 and the fourth chamber 13 are arranged in an up-down stack manner at the other side of the scanning passage P in the container yard.

In combination with FIGS. 2 and 6, the first chamber 11 is located under the second chamber 11', the fourth chamber 13 is located under the third chamber 12, the first chamber 11 located downside and the fourth chamber 13 located downside are each provided with the ray generator device 2 and the ray receiving device 6. It is noted that the ray receiving device 6 in the fourth chamber 13 in FIG. 2 is not shown as it is blocked. The second chamber 11' located upside and the third chamber 12 located upside are each provided with a ray receiving device 6 therein. As shown in FIG. 6, the ray generator device 2 and the ray receiving device 6 arranged in each of the first chamber 11 located downside and the fourth chamber 13 located downside are configured to space from each other in the X axis direction. As shown in FIG. 2, the ray generator device 2 in the first chamber 11 substantially aligns with the ray receiving devices 6 in the third chamber 12 and the fourth chamber 13 in the Y axis direction, i.e., the ray generator device 2 in the first chamber 11 is substantially located in a same YZ plane as the ray receiving devices 6 in the third chamber 12 and the fourth chamber 13, and the ray receiving devices 6 in the first chamber 11 and the second chamber 11' align with the ray generator device 2 in the fourth chamber 13 in the Y direction, i.e., the ray receiving devices 6 in the first chamber 11 and the second chamber 11' are substantially located in a same YZ plane as the ray generator device 2 in the fourth chamber 13. With this configuration, the ray emitted by the ray generator device 2 in the first chamber 11 is received by the ray receiving devices 6 in the third chamber 12 and the fourth chamber 13, and the ray emitted by the ray generator device 2 in the fourth chamber 13 is received by the ray receiving devices 6 in the first chamber 11 and the second chamber 11'. As such, when the container C is driven by a lifting mechanism to move between the ray generator device 2 and the ray receiving device 6, the inspection system may scan the container C from both sides simultaneously and thus the container C may be inspected more effectively.

The above embodiments provide implementations in which the ray generator device and the ray receiving device of the ray inspection system are arranged at either side of the scanning passage, i.e., the ray inspection system is implemented in ray transmission manner. The ray inspection system according to the present disclosure may be implemented in ray back-scattering manner, and is described in detail below in conjunction with FIGS. 3-5.

Figure 3:
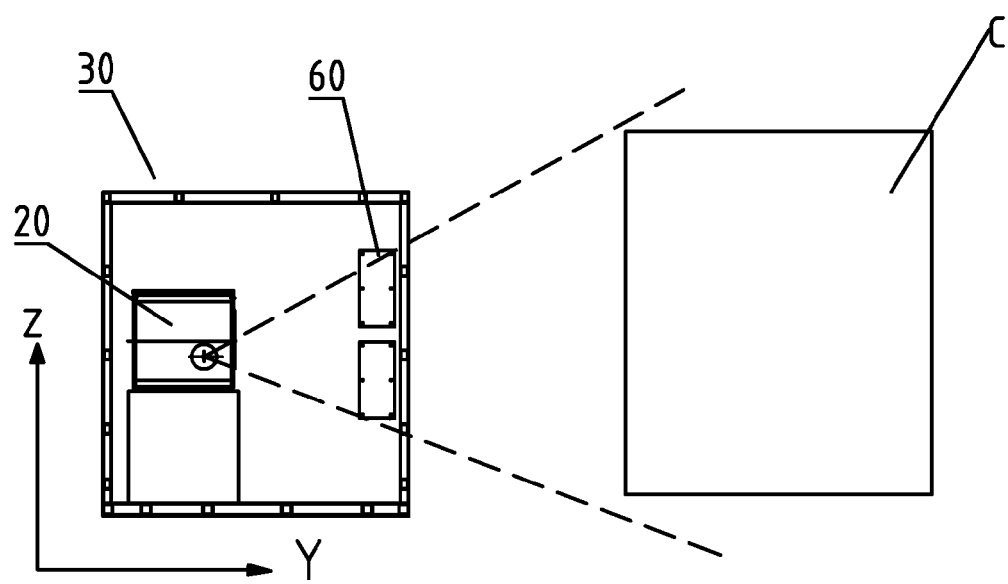
FIG. 3 is a schematic view of a ray inspection system according to an embodiment of the present disclosure, in which the ray inspection system includes one chamber, and the ray generator device and the ray receiving device are arranged at the same side of a scanning passage.

In the embodiment as shown in FIG. 3, a ray inspection system includes one chamber 30 arranged at a side of a scanning passage P in a container yard, and a ray generator device 20 and a ray receiving device 60 are arranged in the chamber 30. That is, the ray generator device 20 and the ray receiving device 60 are arranged at the same side of the scanning passage P and they are in the chamber 30. The chamber 30 is the same as the above chamber and is configured to be a standard container or is configured to have a same shape, a same size and a same structure as a standard container. The ray generator device 20 is configured such that the ray emitted by the ray generator device 20 may scan the entire container C in a height direction (the Z axis direction as shown in FIG. 3) of the container. Although not shown in Figure, it is understood for those skilled in the art that the container C is hoisted by a lifing mechanism in the container yard. In an embodiment, the lifting mechanism moves the container C at a preset velocity along the scanning passage so as to perform inspection of the entire container C.

Although not shown in FIG. 3, it is understood that the ray inspection system in FIG. 3 may also include the above ray protective device and base, etc..

Figure 4:
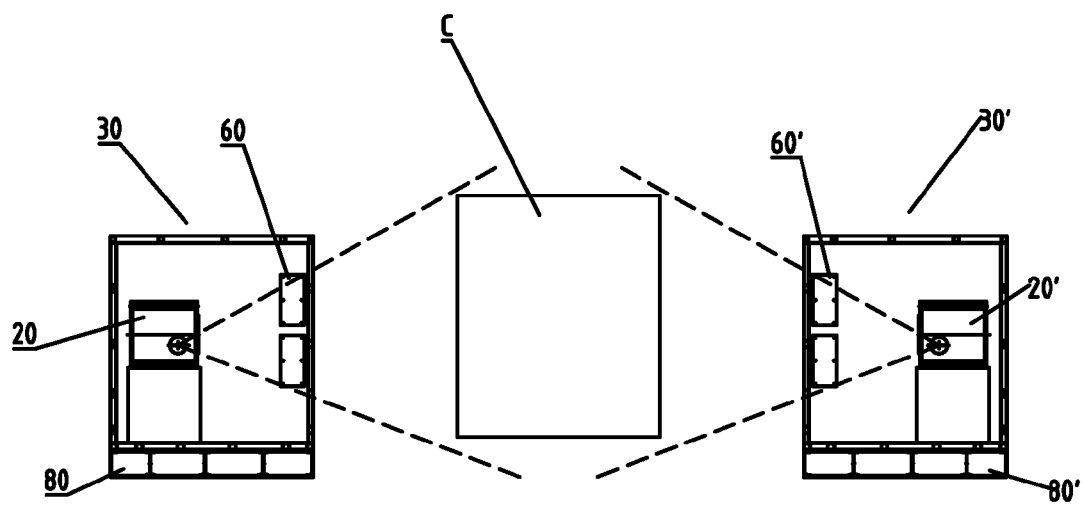
FIG. 4 is a schematic view of a ray inspection system according to an embodiment of the present disclosure, in which the ray inspection system includes two chambers so as to scan a container from two sides.

In the embodiment as shown in FIG. 4, the ray inspection system includes two chambers 30, 30', and the chamber 30, 30' are respectively arranged at a right side and a left side of the scanning passage P in the container yard. A ray generator device 20 and a ray receiving device 60 are provided in the chamber 30, and a ray generator device 20' and a ray receiving device 60' are provided in the chamber 30'. In the embodiment, the ray emitted by the ray generator device 20 is received by the ray receiving device 60, and the ray emitted by the ray generator device 20' is received by the ray receiving device 60'. Scan and inspection on the container C thus may be performed at both sides of the container C by configuring back-scattering ray inspection system at both sides of the scanning passage P, thereby achieving more effective inspection on the container C.

Optionally, the chambers 30, 30' may be located respectively on the bases 80, 80', and, similar to those in the above embodiment, the chambers 30, 30' may be positioned on and fitted to the bases 80, 80' through engagements between the fixing pins and the fixing holes.

Figure 5:
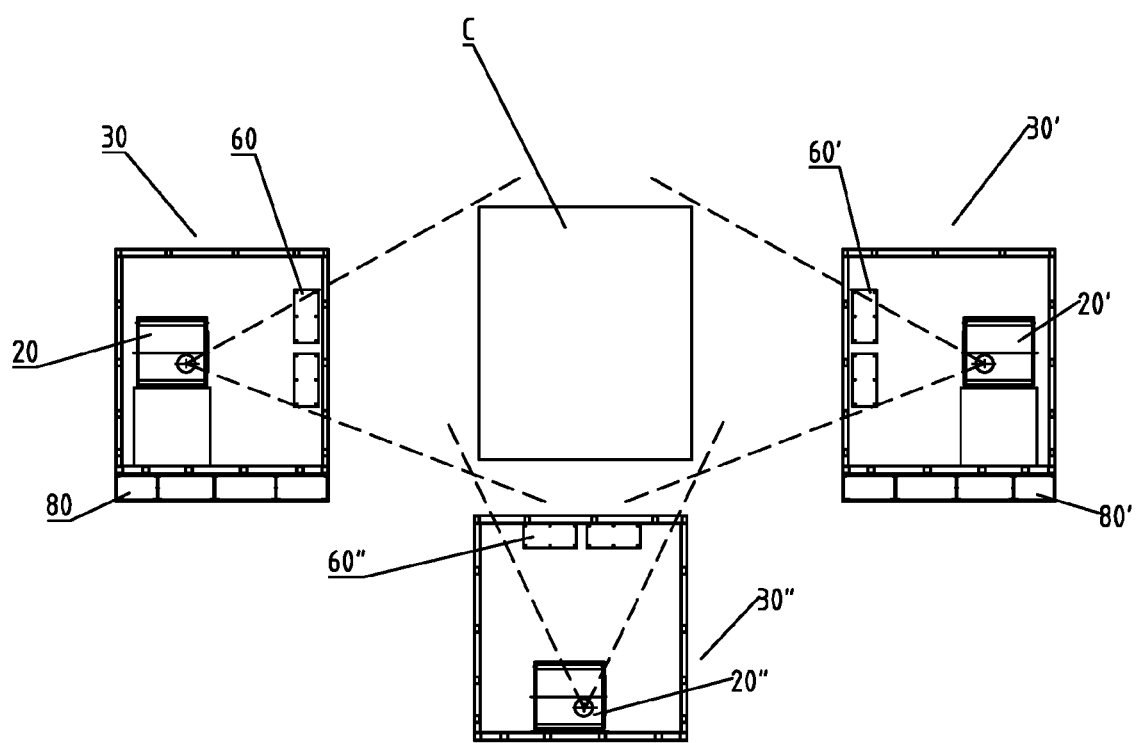
FIG. 5 is a schematic view of a ray inspection system according to an embodiment of the present disclosure, in which the ray inspection system includes three chambers so as to scan a container from a left side, a right side and a downside.

In the embodiment as shown in FIG. 5, the ray inspection system includes three chambers 30, 30', 30", in which the structures and configurations of the chambers 30, 30' are similar to those of the embodiment as shown in FIG. 4, and the chamber 30" is provided with a ray generator device 20" and a ray receiving device 60" therein. As shown in FIG. 5, the chamber 30" is arranged below the container C to be inspected so as to scan and inspect the container C from downside. With this configuration, scan and inspection on the container C may be performed simultaneously from left side, right side and downside, so as to obtain more effective inspection on the container C.

It is understood that, in order to mounting of the chamber 30", a recess (not shown) may be made in the ground under the scanning passage P and the chamber 30" is arranged in the recess; or, the chamber 30" may be placed on ground while the chambers 30, 30' are arranged on locations in higher level. In the latter situation, the container C to be inspected will be hoisted in higher level by the lifting mechanism when passing through the scanning passage P so as to allow scan and inspection on the container C to be performed at the downside of the container C.

Various embodiments of the ray inspection system of the present disclosure are described above in conjunction with FIGS. 1~5. Common components of those ray inspection systems according to the embodiments of the present disclosure will be further described.

Although not shown, it is understood that a control system configured to control apparatuses, mechanisms and devices in the container yard is provided in the container yard. The ray inspection system according to the present disclosure further includes a control device that is in communication with the control system of the container yard and/or a database of the container yard so as to achieve signal and date transmission with the control system of the container yard.

In an embodiment, the ray inspection system further includes a photoelectric conversion device configured to convert the ray received by the ray receiving device to digital signal, and the photoelectric conversion device is in communication with the control device to transmit image information to the control device.

In an embodiment, the ray inspection system further includes a container symbol identification device 50 (as shown in FIG. 6) that is in communication with the control device so as to transmit the identified container symbol information of the container to the control device. The control device is further configured to read the corresponding container information from the control system of the container yard and/or a database of the container yard according to the identified container symbol, and to bond the container information to the image information.

Further, the ray inspection system may further include a power distribution device configured to supply electrical power and/or perform power distribution to electronic devices in the chambers of the ray inspection system.

Further, the control device of the ray inspection system includes a processor configured to communicate with other associated systems and to perform analyzing and processing on the image and/or data captured by the ray inspection system.

A ray inspection method for inspecting a container in a container yard by using the above described ray inspection system will be described in conjunction with FIGS. 6~7. The method may include: stacking the ray inspection system in the container yard by using a container transfer apparatus (for example, a lifting mechanism, etc.) in the container yard. In the embodiment as shown in FIGS. 6 and 7, the chambers 11 or 11', 12, 13 of the ray inspection system are illustratively arranged at either side of the scanning passage P respectively. However, as described above, the chambers of the ray inspection system may be arranged at the same side of the scanning passage P. FIGS. 6 and 7 respectively schematically illustrate embodiments where a container in 45 feet length and a container in 20 feet length are scanned.

In an embodiment, the ray inspection method may be performed while stacking the container. That is, the ray inspection method according to the present disclosure may further include: when the container transfer apparatus performs stacking operation to the container in the container yard, turning on the ray generator device of the ray inspection system and controlling the container transfer apparatus to move the container at a preset velocity along the scanning passage through the ray inspection system, so as to scan the container by the ray inspection system.

Further, the ray inspection method according to the present disclosure may further be implemented when the container transfer apparatus is in an idle state (for example, at night). That is, the ray inspection method according to the present disclosure may further include: when the container transfer apparatus is in an idle state where no stacking operation is performed, turning on the ray generator device of the ray inspection system and controlling the container transfer apparatus to transfer the container and then to move the container at a preset velocity along the scanning passage through the ray inspection system, so as to scan the container by the ray inspection system.

It can be seen that the ray inspection method according to the present disclosure may allow inspection time to be flexibly planned according to requirement of routine schedule of the container yard.

In another embodiment, the step of stacking the ray inspection system in the container yard by using the container transfer apparatus in the container yard may comprise: mounting the bases at preset positions in the container yard; and locating the ray inspection system on the bases by using the container transfer apparatus in the container yard.

In a still another embodiment, the ray inspection method according to the present disclosure may further include:
  identifying the container symbol on the container that is being scanned;
  reading the corresponding container information from the control system of the container yard and/or the database of the container yard according to the container symbol; and
  bonding the container information to image information obtained by scanning of the ray inspection system.

In order to transfer the ray inspection system according to the present disclosure to another location, the ray inspection method according to the present disclosure may further include:
  after completing the scanning to a first stack of containers in the container yard, transferring the ray inspection system to a second stack of containers which are located at different position from the first stack of containers in the container yard by using the container transfer apparatus in the container yard, so as to scan the second stack of containers. With the simple operation, transfer of the ray inspection system may be achieved without a dedicated transportation apparatus and transferring efficiency may be increased.

In the ray inspection system and the ray inspection method according to embodiments of the present disclosure, all components of the inspection system are mounted in one or more container-like chamber and the one or more chamber are stacked with other standard container in a container yard and, when (for example, lifting machine) works, will be hoisted and passed through the inspection system, achieving the scanning to the container. The container inspection system may be directly arranged in a container yard without provision of additional or dedicated place for apparatus, and an amount of place may be saved. Further, the ray inspection system and the ray inspection method according to embodiments of the present disclosure do not require transferring a container by a vehicle to a separated location or an operation field, and may scan a container by using an existing container transfer apparatus in a container yard to lift the container to pass through the inspection system, thereby further increasing inspection efficiency. Further, the container-like chambers of the ray inspection system according to the present disclosure may be conveniently transferred to or mounted in another location or field by using an existing lifting machine or other container transfer apparatus, thereby largely reducing difficulty in assembly and transfer of the container inspection system as desired.

Although the present disclosure is described with reference to several typical embodiments, it is understood that the terms as used are illustrative and exemplary terms, instead of limitation terms. As the present invention may be implemented in a plurality of embodiments without departed from the spirit of the present disclosure, it is understood that the above embodiments are not limited to the above detail, but shall be interpreted widely within the spirit and scope defined by the claims. Thus, all changes and modifications of the embodiments which fall into the scope or equivalent of the claims shall be covered by the attached claims.

The invention claimed is:

1. A ray inspection system used to be mounted in a container yard to inspect an object within a container, the ray inspection system comprising:
a ray generator device configured to emit a ray, a ray receiving device configured to receive the ray, and at least one chamber for receiving the ray generator device and the ray receiving device therein, the ray inspection system being configured to define a scanning passage, wherein:
each of the at least one chamber is configured to be a standard container or a chamber which has a same shape, a same size and a same structure as a standard container, such that the ray inspection system is adapted to be stacked in the container yard.

2. The ray inspection system according to claim 1, wherein each of the at least one chamber is provided with a hoisting coupling that is the same as that of the standard container so as to be hoisted by a container transfer apparatus.

3. The ray inspection system according to claim 1, wherein the ray inspection system includes a first chamber, a second chamber and a third chamber, the first chamber is arranged at a side of the scanning passage in the container yard, and the second chamber and the third chamber, stacked up-down with each other, are arranged at the other side of the scanning passage, and wherein,
the first chamber is provided with the ray generator device therein and each of the second chamber and the third chamber is provided with the ray receiving device therein, and the ray generator device and the ray receiving devices are substantially aligned with one another in a second direction perpendicular to a first direction along which the scanning passage extends.

4. The ray inspection system according to claim 3, further comprising bases that respectively correspond to the chambers at either side of the scanning passage, the bases being provided with fixing pins and/or fixing holes and each of the chambers is provided with corresponding fixing holes and/or fixing pins such that, when the chambers are positioned and mounted on corresponding bases respectively by engagements between the fixing pins and the fixing holes, the ray generator device and the ray receiving devices that are located at either side of the scanning passage are substantially aligned to one another in the second direction.

5. The ray inspection system according to claim 4, wherein a height of the bases is equal to a difference between a height of a high container and a height of a standard container.

6. The ray inspection system according to claim 1, wherein the at least one chamber comprises a first chamber, a second chamber, a third chamber and a fourth chamber, the second chamber and the first chamber, stacked up-down with each other, are arranged at a side of the scanning passage in the container yard, and the third chamber and the fourth chamber, stacked up-down with each other, are arranged at the other side of the scanning passage, and wherein,
each of the first chamber located downside and the fourth chamber located downside is provided with the ray generator device and the ray receiving device therein, and each of the second chamber located upside and the third chamber located upside is provided with the ray receiving device, wherein the ray generator device and the ray receiving device provided in each of the first chamber and the fourth chamber are arranged to space away from each other in the first direction along which the scanning passage extends, and the ray generator device in the first chamber is substantially aligned with the ray receiving devices in the third chamber and the fourth chamber in the second direction perpendicular to the first direction, and the ray receiving devices in the first chamber and the second chambers are substantially aligned with the ray generator device in the fourth chamber in the second direction perpendicular to the first direction.

7. The ray inspection system according to claim 6, further comprising bases that respectively correspond to the chambers at either side of the scanning passage, the bases being provided with fixing pins and/or fixing holes and each of the chambers is provided with corresponding fixing holes and/or fixing pins such that, when the chambers are positioned and mounted on corresponding bases respectively by engagements between the fixing pins and the fixing holes, the ray generator devices and the ray receiving devices that are located at either side of the scanning passage are substantially aligned to one another in the second direction.

8. The ray inspection system according to claim 7, wherein a height of the bases is equal to a difference between a height of a high container and a height of a standard container.

9. The ray inspection system according to claim 1, wherein the at least one chamber comprises one chamber, which is arranged at a side of the scanning passage in the container yard, and in which the ray generator device and the ray receiving device are provided.

10. The ray inspection system according to claim 1, further comprising a control device that is in communication with a control system in the container yard and/or a database in the container yard.

11. The ray inspection system according to claim 10, further comprising a photoelectric conversion device configured to convert the ray received by the ray receiving device to a digital signal, the photoelectric conversion device being in communication with the control device so as to transmit image information as the digital signal to the control device.

12. The ray inspection system according to claim 11, further comprising a container symbol identification device configured to identify contain symbol and being in communication with the control device so as to transmit the identified container symbol information to the control device, the control device being configured to read corresponding container information from the control system of the container yard and/or a database of the container yard according to the identified container symbol and to bond the container information to the image information.

13. The ray inspection system according to claim 1, further comprising a ray protective device arranged in each of the at least one chamber and configured to shield the ray at a preset location or to shield the ray at preset time.

14. A ray inspection method for inspecting a container in a container yard using the ray inspection system according to claim 1, the method comprising:
stacking the ray inspection system in the container yard by using a container transfer apparatus in the container yard, such that the ray inspection system defines a scanning passage; and
when the container transfer apparatus performs stacking operation to the container in the container yard, turning on the ray generator device of the ray inspection system and controlling the container transfer apparatus to move the container at a preset velocity along the scanning passage through the ray inspection system, so as to scan the container by the ray inspection system.

15. The ray inspection method according to claim 14, further comprising:
when the container transfer apparatus is in an idle state where no stacking operation is performed, turning on the ray generator device of the ray inspection system and controlling the container transfer apparatus to transfer the container and then to move the container at a preset velocity along the scanning passage through the ray inspection system, so as to scan the container by the ray inspection system.

16. The ray inspection method according to claim 14, wherein the ray inspection system further comprises bases that respectively correspond to the chambers at either side of the scanning passage, the bases being provided with fixing pins and/or fixing holes and each of the chambers is provided with corresponding fixing holes and/or fixing pin such that, when the chambers are positioned and mounted on corresponding bases respectively by engagements between the fixing pins and the fixing holes, the ray generator device and the ray receiving device that are located at either side of the scanning passage are substantially aligned to one another in the second direction;
wherein the stacking the ray inspection system in the container yard by using the container transfer apparatus in the container yard comprises:
mounting the bases at preset positions in the container yard; and
locating the ray inspection system on the bases by using the container transfer apparatus in the container yard.

17. The ray inspection method according to claim 14, the ray inspection system further comprises a container symbol identification device configured to identify contain symbol and being in communication with a control device so as to transmit the identified container symbol information to the control device, the control device being configured to read corresponding container information from a control system of the container yard and/or a database of the container yard according to the identified container symbol and to bond the container information to the image information;
the method further comprises:
identifying the container symbol on the container that is being scanned;
reading the corresponding container information from the control system of the container yard and/or the database of the container yard according to the container symbol; and
bonding the container information to image information obtained by scanning of the ray inspection system.

18. The ray inspection method according to claim 14, further comprising:
after completing the scanning to a first stack of containers in the container yard, transferring the ray inspection system to a second stack of containers which are located at different position from the first stack of containers in the container yard by using the container transfer apparatus in the container yard, so as to scan the second stack of containers.

* * * * *